| United States Patent [19] | [11] Patent Number: 4,595,596 |
|---|---|
| Fazzolare et al. | [45] Date of Patent: Jun. 17, 1986 |

[54] CRACKERS HAVING STABILIZED SUNFLOWER SEEDS

[75] Inventors: Richard D. Fazzolare, Pearl River, N.Y.; Rudolf Windmuller, Wayne, N.J.

[73] Assignee: Nabisco Brands, Inc., Parsippany, N.J.

[21] Appl. No.: 611,877

[22] Filed: May 18, 1984

[51] Int. Cl.$^4$ ............................................. A21D 10/00
[52] U.S. Cl. ................... 426/549; 426/629; 426/653
[58] Field of Search .................... 426/549, 629, 653

[56] References Cited

U.S. PATENT DOCUMENTS

| 1,154,059 | 9/1915 | Rosell | 426/629 |
|---|---|---|---|
| 1,848,896 | 3/1932 | Seyer | 426/629 |
| 2,955,040 | 10/1960 | Avera | 426/555 |
| 2,990,285 | 6/1961 | O'Neal | 426/555 |
| 3,134,677 | 5/1964 | Glabe | 426/534 |
| 3,196,914 | 7/1965 | Gardner | 99/629 |
| 3,217,764 | 11/1965 | Gardner | |
| 3,269,442 | 8/1966 | Gardner | |
| 3,567,465 | 4/1968 | Knechtel | 426/629 |
| 3,645,752 | 2/1972 | Baxley | 426/438 |
| 3,697,290 | 11/1969 | Lynn | 426/629 |
| 3,740,236 | 6/1973 | Baxley | 426/293 |
| 3,937,852 | 2/1976 | Wolf | 426/549 |
| 3,937,892 | 2/1976 | Wolf | 426/549 |
| 3,951,057 | 4/1976 | Gardner | 99/629 |
| 3,964,379 | 6/1976 | Gardner | 99/541 |
| 4,113,889 | 8/1978 | Baxley | 426/509 |
| 4,208,433 | 6/1980 | Barham, Jr. | 426/629 |
| 4,285,698 | 8/1981 | Otto et al. | 23/230 B |
| 4,297,376 | 10/1981 | Nelson et al. | 426/803 |
| 4,317,411 | 3/1982 | Forrest | 99/623 |
| 4,325,297 | 4/1982 | Weyant | 99/625 |
| 4,397,228 | 8/1983 | Thornton | 99/541 |

FOREIGN PATENT DOCUMENTS

| 2358832 | 2/1978 | Fed. Rep. of Germany . |
|---|---|---|
| 197802 | 3/1978 | France . |
| 107543 | 8/1979 | Japan . |
| 57-181648 | 11/1982 | Japan . |

OTHER PUBLICATIONS

Stur-Dee Health Products catalog, 1964, Brooklyn, NY, p. 43.
Swern, 1979, Bailey's Industrial Oil and Fat Products, vol. 1, 4 ed., J. Wiley & Sons, NY, p. 258.
De Gouy, 1944, *The Bread Tray*, Greenburg publisher, NY, pp. 325, 385.
Matz, 1968, Cookie and Cracker Technology, AVI Publishing Co., Westport, Ct.
Borgstrom, 1968, Principles of Fd Sci, vol. 1, p. 360, MacMillian Co., Toronto, Canada.
Desrosier, 1977, Elements of Food Technology, AVI Publishing Co., Inc., Westport, CT, p. 479.

*Primary Examiner*—Raymond N. Jones
*Assistant Examiner*—Carolyn Paden
*Attorney, Agent, or Firm*—Richard Kornutik

[57] ABSTRACT

The invention discloses a process for making a baked dough product in which stabilized nuts or seeds have been incorporated into the dough prior to shaping and baking of the dough into a final product. The use of stabilized sunflower seeds in cracker dough is specifically addressed. Stabilized nuts and seeds are those which have been partially defatted and then impregnated with a more stable oil.

5 Claims, No Drawings

CRACKERS HAVING STABILIZED SUNFLOWER SEEDS

BACKGROUND OF THE INVENTION

1. Field of the Invention

This invention relates to the production of baked dough products containing stabilized seeds. In particular, this invention relates to crackers containing stabilized seeds, especially stabilized sunflower seeds.

2. Description of the Prior Art

The public is becoming ever increasingly aware of the importance of nutritious diets in leading a healthy life. A hallmark of this awareness is the gradual movement away by the public from the consumption of high sugar content candies and cookies. There is a growing consumption of food produced containing natural flavors and ingredients. Nut and seed products have replaced candy in the diets of many people. With this change in eating habits, there remains a need for processed snack food, which can be easily transported, stored, and consumed without any preparation of the product by the consumer.

Traditionally, cookies and crackers have served to provide ready processed foods which can be transported and stored without any special refrigeration or packaging. New forms of cookies and crackers made from baked doughs are gradually appearing in the market place. These new cookies and crackers are substitutes for snack products containing a high sugar content. These new products frequently contain nutritious, naturally flavored, crunchy substances such as nuts and seeds. The inclusion of nuts and seeds in baked dough products often causes stability problems due to their content of naturally occurring unstable oils. Also, nuts and seeds disrupt the dough matrix of cookie or cracker products causing machining problems.

An endeavor to develop a flour based composition in which seeds, in this case sesame seeds, are present in a snack food is witnessed by U.S. Pat. No. 2,990,285 to O'Neal. This patent discloses numerous formulas containing cracker flour and wheat flour in which sesame seeds are present in high concentration. A seed containing composition is mixed and then extruded and dropped into a deep fat cooker. The rapid frying in a deep fat cooker makes the composition crispy and allows it to develop a consistency which can hold together in the form of a cracker. A drawback to the cracker, as disclosed in this patent, is that it is deep fried. Deep fried food products are often shunned or avoided by members of the public desiring to lower their total fat and oil intake. Additionally, this product does not contain any large nut or seed particles. The presence of such large, chewable particles adds a gratifying texture to a snack food or cracker.

Another example of a seed containing cracker product is disclosed in U.S. Pat. No. 4,297,376 to Nelson. This patent provides a new dough composition which has a nut like bite. This is a result of the use of both ground corn dough as well as the presence of sesame seeds in the product. This product is also prepared in a deep fat fryer and does not contain large nut or seed particles.

A baked dough product that includes large nut particles together with nut oils, is found in French Pat. No. 197,802. In this patent, nut oil is added to the dough mix to change or improve the flavor of the bread. The oil is not used to stabilize or treat the nuts against oxidation.

The use of nuts and seeds in baked products such as biscuits and crackers is known. Descriptions of their uses can be found in Matz, *Cookie and Cracker Technology*, The AVI Publishing Company, Inc., West Port, Conn. (1968) at pages 85–90. As is discussed in this reference, stability and shelf life is a considerable problem when seeds and nuts are incorporated into doughs. Some oils present in nuts and seeds frequently become rancid and ruin a baked dough product more rapidly than occurs without their presence. Defatting of nuts and seeds of these oils prior to baking improves the product's shelf life, but causes the nuts and seeds to lose their flavor or become unacceptably hard.

The desire to improve the stability of nuts and seeds has challenged many in the food industry and has initiated considerable inventive activity. Much of this activity has focused on preserving peanuts, but the techniques developed are often transferable to other nuts and seeds. Sunflower seeds, for example, like peanuts are subject to oxidative rancidity, absorb foreign odors, and undergo color changes. These changes are accelerated where the nuts or seeds have been shelled. Even further acceleration of this degradation is experienced where the nuts and seeds have been chopped. The chopping of a nut or seed increases the amount of surface area exposed to oxygen. For example, cured whole peanuts in the shell have a useful storage life of 9 months or more. Chopped peanuts can be expected to exhibit off-flavors in a couple of weeks.

Methods suggested to improve the stability of nuts and seeds in biscuits and crackers have generally centered around the use of antioxidants. Antioxidants can include citric acid, butylated hydroxyanisole (BHA), butylated hydroxytoluene (BHT), propyl gallate, and others. Most antioxidants chelate metals, such as copper, which catalize the oxidation of a fat or oil. Another method of preserving nuts and seeds used in the making of biscuits or crackers is to coat the nuts or seeds. Generally, the coating is of zein and acetylated monoglycerides. Other coatings include waxes, shellac, and resins. These coatings seal the seed or nut and protect it from penetration of oxygen. Antioxidants and coatings generally do not maintain the freshness and flavor of nuts and seeds as well as when they have been defatted.

An improvement to the keeping qualities of sesame seeds in a flour product is seen in U.S. Pat. No. 3,134,677 to Glabe. The product disclosed in this patent is made by heating sesame seeds in water vapor to partially hydrolyze the natural cellular structure of the seed. Oil is removed from the seeds and the seeds can then be roasted and used in a flour product.

A method similar to that disclosed in the Glabe patent, but for use in improving the keeping qualities of nuts, is found in U.S. Pat. No. 3,740,236 to Baxley. In this method, nuts are partially defatted by pressing and then are reconstituted in an aqueous solution. The nuts are surface coated by a binder in the solution. Dextrin is an example of such a binder. Antioxidants can then be added.

In both of the Glabe and Baxley patents above, some of the flavor of the nut or seed is changed with the partial removal of its oils. Oil removal can also cause changes to the texture and "crunchiness" of the nut or seed.

An example of maintaining the freshness of a nut or seed by applying a coating is located in Japanese Pat.

No. 107,543. In this patent nuts are coated after roasting with waxes, shellac, resins, or co-polymers.

U.S. Pat. No. 3,645,752 to Baxley discloses a method of making stabilized impregnated peanuts. In this method, the nuts are pressed to remove a substantial portion of their natural oil. The nuts are then oil roasted and returned to their original shape and size. After this the nuts are transferred to a second oil bath at a substantially lower temperature than the first. The lower temperature causes the second oil to be drawn into the nut's internal oil cells and to impregnate the nuts. This second or replacement oil is preferably a high stability oil. By replacing the natural oil in the nuts in this manner, the nuts, become more stable to oxidation. This reference is also directed to the stabilization of nuts in which flavoring of a different nut type is added to the second oil. With such an addition the final product, though it may be, for example, a peanut is made to taste like a walnut or some other nut.

The prior art does not disclose examples of incorporating stabilized nuts or seeds into a dough to produce a biscuit or cracker with a stable shelf life. An object of this invention is to provide a flavorful, crunchy baked dough product with a high content of stabilized nuts and seeds. In particular, it is an object of this invention to provide a product which is high in stabilized sunflower seeds.

SUMMARY OF THE INVENTION

The invention is a baked product comprising a dough and a quantity of stabilized edible seeds incorporated into the dough prior to shaping and baking of the dough into the final product. For purposes of this invention the term seeds can represent all edible seeds as well as those seeds commonly referred to as nuts.

The preferred embodiment of the invention includes a process where the natural oil of sunflower seeds is first partially extracted and then replaced with a more stable oil. The stabilized sunflower seeds are then incorporated into a dough having both a medium flour and a high gluten flour. Other nuts and seeds such as almonds and poppy seeds can also be included. A whole wheat or graham flour can be used to provide a rich, dark color to the dough. The dough is then baked in an oven. The resultant product is a stable, nutritious sunflower seed cracker.

Alternative embodiments can include the presence or absence of additional nuts and seeds of which some or all can be stabilized depending upon their particular storage capabilities. Alternative embodiments can also include different flours such as corn flours or flours of a lower gluten content.

DETAILED DESCRIPTION OF THE INVENTION

The present invention provides a baked dough product containing stabilized nuts or seeds. For purposes of this invention a baked dough refers to either a biscuit or a cracker without particular reference to the type or presence of leavening agents. In the preferred embodiment stabilized sunflower seeds are incorporated into a cracker dough containing chemical leavening. Other seeds and nuts which have not been stabilized can be added to enhance the flavor and nutritional value of the cracker. This mixture is then shaped into a desired form, baked, and packed. The resulting product is a nutritious, satisfying cracker with a shelf life not thought possible of a baked sunflower seed product. Typical rancid free shelf lives are up to 6 months in contrast to approximately 6 weeks with a product containing unstabilized sunflower seeds. Accelerated tests on products containing unstabilized sunflower seeds are counted at about 126° F. and result in rancidity in about 2 to 4 weeks.

Chemically leavened doughs and yeast leavened sponge good doughs can be used in the formulation of this product. For commercial production of this product it is desirable to combine two or more flours to produce the dough. The use of two or more flours allows the baker to develop the color, flavor, and texture of the final cracker or biscuit. Usually an all purpose wheat flour of medium protein content and strength is the primary ingredient in a baked good of this type.

Soft wheat flours can vary in protein from about 7 to 7.5% for biscuit and cookie products to about 10% or more for cracker products. In part, the amount and type of protein present in a flour helps to determine its strength. The proteins which contribute to strength are called, in sum, gluten. The strength of a flour determines in part the flow characteristics and resistance to mixing of the wet dough mixture and also affects the surface appearance and internal crumb texture of the baked product.

The addition of other ingredients, such as nuts or seeds, disrupts the internal crumb matrix of a product and the strength of the dough sheet. To bake crackers and biscuits having large nuts or seeds incorporated into them, a high gluten flour can be added to the dough mix. The increased strength adds to the viscosity of the dough and affects the spread of the dough when on a baking sheet. The increased strength from adding a high gluten flour to the dough prevents it from excessive running and adds brittleness or snap to the final baked product. The use of a high gluten flour with chemical leavening as in the preferred embodiment of this invention produces a crisp product after baking with a moisture content between about 1 percent and about 1.7 percent.

In the preferred embodiment of this invention approximately 10 to 15 pounds of sunflower seeds per 100 pounds of total flour are incorporated into a cracker dough. In this embodiment it is the size of the seed particles which is responsible for disruption of the crumb matrix and the strength of the dough sheet. A high gluten flour content of between 15 to 25 pounds per 100 pounds of total flour and more particularly between 17.5 to 22.5 pounds of per 100 pounds of total flour is suitable to maintain the strength of the dough. By contrast 20 pounds of sesame seeds, which are much smaller in size, can be incorporated into 100 pounds of medium flour without the addition of any high gluten flour and do not significantly disrupt the dough sheet. When particles present in a cracker dough average a size larger than sesame seeds, for example more than about 2 to 3 millimeters in diameter, and are present in a concentration of about 5 to 10 pounds per 100 pounds of total flour, they are disruptive to the dough sheet and the addition of a high gluten flour or similar measure becomes necessary.

An alternative embodiment of the invention involves the use of wheat gluten added in sufficient quantity to a medium or other flour to enable laminating and sheeting of the dough. Gluten additive increases the strength of the dough. A suitable flour blend comprising flour and wheat gluten has about 9 to 10 percent of total gluten to the total weight of flour used to make the dough. This amount of total gluten in the flour mix is calculated from all sources and adds enough strength to the dough that sunflower seeds, in amounts according to this invention, can be successfully incorporated. When there is increased particle size and concentration in a dough, gluten can be added in amounts greater than 10 percent of the flour weight. Gluten can be added until the dough is too strong to machine or until the resulting product is unpalatable.

In the commercial production of biscuits and crackers, various combinations of flours are often used to achieve a desired color. A golden brown color can be achieved by normal baking of any flour, however, to give the final product a richer, darker brown coloring the addition of whole wheat, bran flours, bran containing flours such as graham flour, sorghum, or rye flours can be used. These flours affect the flavor of the cracker or biscuit. Rye and corn flours are frequently used in cracker dough where less sweetness is desired in the final product.

The texture of the final product is determined largely by the milling and the grade of the primary flour and the size of the nut and seed particles used. In the preferred embodiment of this invention the primary flour used is a medium flour. This particular flour gives the final product a pleasant even texture and a satisfying taste. The texture of a biscuit or cracker is also affected by the type and amount of shortening used and the presence of nuts, seeds, or fruit. In the preferred embodiment, sunflower seeds and almonds provide large, chewable particles to the texture of the final baked product and poppy seeds and/or sesame seeds provide smaller particulates.

Commercial cracker doughs are usually laminated. Laminating is the layering of a plurality of sheets, which are about ½ inch thick, in a zigzag fashion over one another. A plurality of these layers, usually 2 to 4 sheets which together are about 1 to 2 inches in thickness, are fed to the reduction roller. During this process the dough is rolled into a sheet that is reduced in thickness by stages. For example, a batch of cracker dough can be initially rolled into a ½ inch sheet. This sheet is reduced to about a ¼ inch thickness in the first reduction roll. The thickness of the sheet is then reduced again to about 1/16 inch in a gauge roll. After this final reduction in thickness the dough is ready for cutting into cracker shaped pieces or its final shape.

A high percentage of large particles in a medium flour cracker dough, such as 10 to 20 pounds of sunflower seeds per 100 pounds of total flour, causes the dough sheet to tear during machining. When the dough contains approximately 20 pounds of high gluten flour per 100 pound of total flour, it has enough strength to hold the seeds and not tear or break apart during the machining process. The addition to the dough during mixing of less than 1 ounce of an enzyme relaxes the gluten and increases the extensibility of the dough.

Other ingredients which can be used to make the dough of biscuits and crackers include shortening, which can be a lard or vegetable shortening, such as sunflower or soy oil, various salts, and preservatives. Shortening ingredients are used to affect the rheology of the dough and to contribute to the tenderness of the final product. Salt is often used to flavor the biscuit or cracker. Preservatives assist in maintaining the shelf life of the dough itself and prevent the spread of bacterial growth within the dough. Additional miscellanous ingredients in making biscuits and crackers can be found in Matz, Supra at p. 96–115. These additional ingredients can include corn syrup as a sweetner as well as light malt syrup which adds sweetness and color to the final product.

Nuts and seeds, for use in this invention can, vary according to the final product desired. The term "seed" refers to the entire fertile ovule from which a plant can reproduce. The term "nut" can refer to an entire seed or the kernel of a seed. The kernel of a seed is the contents of the seed absent the coating or shell. The term, seed, includes the term, nut, but generally the term, nut, implies a seed which is only edible absent its shell. Most nuts and seeds are dried or roasted prior to consumption.

The most common seeds used in baked dough products are peanuts. Peanuts exist in numerous varieties. The fruit of the peanut plant is not a true nut. It appears when the immature pod of the plant penetrates into the soil. The fruit ripens underground. The pod contains from one to six reddish brown seeds.

Sunflower seeds are grown for feed or oil extraction, but are not commonly found in baked dough products. Sunflower seeds also exist in numerous varieties with different varieties being more stable than others. The highly unsaturated oil content of all varieties makes the seeds prone to oxidative rancidity. This occurs even though the seeds contain natural tocopherols which are antioxidants. Commonly, a single dehulled, raw seed is between 48 to 52% oil by weight. The seeds appear in the center of a large yellow-rayed flower head and a single head contains many seeds.

Many other nuts and seeds are popular for incorporation into a baked dough product, which are generally stable without being treated. Almonds and walnuts are a popular example. Sesame seeds and poppy seeds are, also, frequently included in baked products to add flavor as well as texture as discussed above. The propensity of these nuts and seeds to oxidative degradation is much less than peanuts and sunflower seeds due to the type of oils they contain. Other nuts and seeds are frequently lower in unsaturated oils and fats.

It has been found that walnuts, almonds, poppy seeds, and sesame seeds can be included in a baked dough product without being stabilized, but other procedures are often utilized to protect them from rancidity such as coating applications. Sunflower seeds are considered so disruptive to the shelf life of a baked dough product that until this invention they have required undesirable preservation treatments prior to such use. Sunflower seeds were previously avoided altogether for inclusion into dough products. These and other nuts and seeds must be stabilized in order to make a satisfactory product.

Stabilized nuts and seeds for use in this invention are those dehulled seeds which are initially defatted by pressing. This pressing removes about 30 to 50 of their oil. They are then reconstituted by oil roasting which returns them to their approximate original shape and size. This leaves the oil capsules within the seed in a vacuum. After oil roasting the nuts are drained and, while still hot, transferred to a second oil bath of a substantially lower temperature than the first. The vacuum within the oil cells of the nut or seed is released not by air, but by the second oil from the bath. In this manner the original oil within the nut or seed is replaced. The replacement oil is at the option of those stabilizing the nut or seed. This process is disclosed in U.S. Pat. No. 3,645,752 to Baxley as discussed above and is herein incorporated by reference.

The preferred embodiment of this invention uses stabilized sunflower seeds in the baked good. Sunflower seeds are high in natural oil and have a growing popularity with consumers. By stabilizing sunflower seeds according to the above process, their original texture and flavor can be maintained. Stabilized nuts and seeds can be prepared by the above process or can be bought commercially. Stabilized sunflower seeds, for example, can be obtained from Seabrook Blanching Corporation, Peanut Drive, P.O. Box 609, Edenton, NC 27932.

In the preferred embodiment the replacement oil used to stabilize sunflower seeds is sold under the trademark, Durkex-100. This oil is available from the Durkee Industrial Foods Group, Cleveland, Ohio 44115. It is a fractionated partially hydrogenated soybean oil. It can also contain partially hydrogenated coconut and cotton seed oils. This products can also contain lecithin and antioxidants such as BHA and citric acid. In the preferred embodiment the antioxidant, tertiary butyl hydroxyquinone (TBHQ), is also used. The active oxygen method (AOM) oil stability test of the American Oil Chemist Society places the stability of this oil at over 90 hours. This is contrasted to AOM test data of 6 to 15 hours for natural sunflower seed oil.

Natural raw sunflower seeds contain about 6.5% moisture. After stabilization by the above process they contain a moisture content of between about 2 percent and about 3.5 percent. As disclosed in U.S. Pat. No. 3,740,236 to Baxley, which is discussed above, nuts and seeds can be stabilized by reconstituting with an aqueous solution. The use of this method for the present invention is unsatisfactory because the moisture within these nuts and seeds migrates into the cracker and ruins the flavor and texture of the final product.

The practice of this invention is observed from the following examples and methods of making the invention. In these embodiments sunflower seed containing crackers are made.

EXAMPLE I

Stabilized sunflower seeds that are reconstituted with a Durkex-100 oil are blended together with sugar, salt, lecithin, dry whey, and vegetable oil. These ingredients are mixed for about 4 minutes at 18 RPM. To this mixture water, corn syrup, malt syrup, and various flavorings are added with continued mixing for about 4 minutes at 18 RPM. High gluten flour and medium flour are then added. Additionally, sodium bicarbonate and calcium phosphate are added at this point with continued mixing. Then, with the formula water below 90° F., an enzyme is added to relax the gluten formation. Ammonium bicarbonate dissolved in the remaining formula water is added. Mixing is continued for about 6 minutes at 30 RPM until the dough is a consistent mass with the seed particles evenly dispersed. Total final dough mixing time is usually about 5 to 6 minutes. The dough proof time is about 3½ hours. Upon formation, the dough is laminated and sheeted in stages prior to cutting. The cut dough is baked between 4 to 5 minutes at between 400° to 550° F.

Typical compositions which can be suitable in the practice of the invention are the following:

TABLE I

| Ingredients | % Of Total Dough Weight |
| --- | --- |
| Medium Flour | 47.9% |
| High Gluten Flour | 11 |
| Stabilized Sunflower seeds | 9.5 |
| Vegetable Oil | 4 |
| Sugar | 2 |
| Salt | 1 |
| Chemical leavening agents | 2.5 |
| Flavoring | <.5 |
| Lecithin | <.5 |
| Enzymes | <.1 |
| Water | 21 |

Prior to baking, topping salt can be added. After baking vegetable spray oil can be applied.

EXAMPLE II

This example can be conducted in the same manner as that in example I except that the following formula can be used:

TABLE II

| Ingredients | % Of Total Dough Weight |
| --- | --- |
| Medium flour | 40 |
| High gluten flour | 10 |
| Graham flour | 6 |
| Stabilized sunflower seeds | 8 |
| Diced almonds | 3 |
| Sesame seeds | 3 |
| Poppy seeds | 1 |
| Vegetable oil | 3 |
| Sugar | 1.5 |
| Salt | 1 |
| Chemical leavening agents | 2 |
| Flavoring | <.5 |
| Lecithin | <.5 |
| Enzymes | <.1 |
| Water | 20.4 |

The additional nuts and seeds can be added into the blend with the sunflower seeds.

EXAMPLE III

This example can be conducted in the same manner as that in Example I except that the following formula can be used:

TABLE III

| Ingredients | % Of Total Dough Weight |
| --- | --- |
| Medium flour | 52.5% |
| Wheat gluten additive | 2.5 |
| Stabilized sunflower seeds | 8 |
| Stabilized peanuts containing almond flavoring | 3 |
| Sesame seeds | 1 |
| Poppy seeds | 1 |
| Vegetable oil | 3 |
| Sugar | 1.5 |
| Salt | 1 |
| Chemical leavening agents | 2 |
| Flavoring | <.5 |
| Lecithin | <.5 |
| Enzymes | <.1 |
| Water | 21.4 |

What is claimed is:

1. A method of making a sunflower seed containing cracker comprising:
   (a) stabilizing to a moisture content between about 2 percent and about 3.5 percent a quantity of dehulled sunflower seeds by impregnating them with a high stability oil, said sunflower seeds having diameters of about 2 to 3 millimeters;
   (b) blending said stabilized sunflower seeds with water and shortening;
   (c) mixing said blended sunflower seeds, water, and shortening with a mixture of flour, said mixture of flour having between 15 to 25 pounds of a high gluten flour per 100 pounds of total flour to form a dough, said sunflower seeds being in a concentration of about 5 to 10 pounds per 100 pounds of total flour;

(d) machining said dough into a dough sheet;

(e) cutting said dough sheet to form a cracker shaped pieces of said sheeted dough; and (f) baking said cut, cracker shaped pieces of dough to a moisture content between about 1 percent and about 1.7 percent whereby said crackers are rancid free and shelf stable at room temperature for up to 6 months.

2. The process of claim 1, wherein said high stability oil includes a partially hydrogenated soybean oil.

3. The process of claim 1, wherein said high stability oil contains an antioxidant.

4. The process of claim 1, wherein a plurality of unstabilized seeds are incorporated into said dough prior to said dough being machined and baked into said cracker.

5. The process of claim 4, wherein said plurality of unstabilized seeds are selected from the group consisting of poppy seeds, sesame seeds, almonds and mixtures thereof.

* * * * *